Feb. 2, 1954
J. E. SAMPSON
2,667,676
SAFETY PIN
Filed June 7, 1951
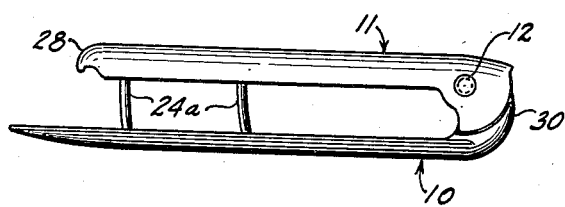
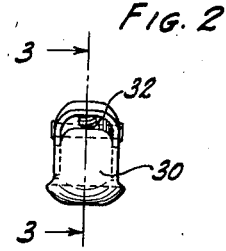
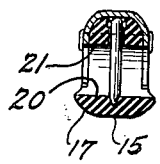
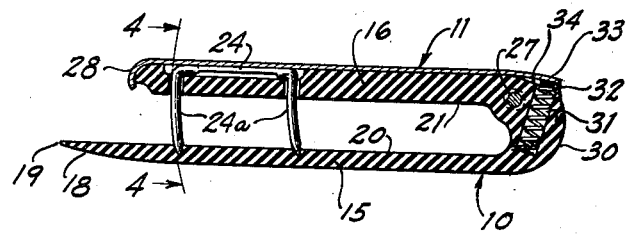
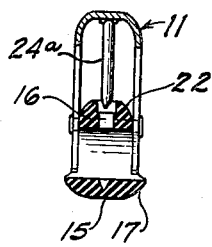
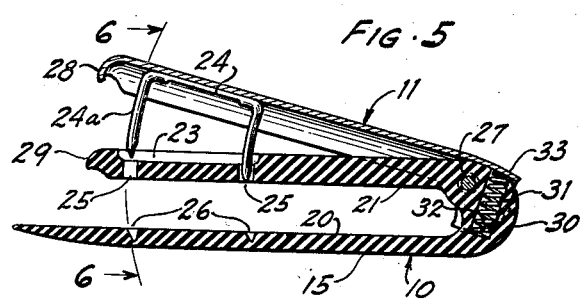
INVENTOR.
JULIAN E. SAMPSON
BY Patented Feb. 2, 1954

2,667,676

UNITED STATES PATENT OFFICE 2,667,676

SAFETY PIN

Julian E. Sampson, St. Louis, Mo.

Application June 7, 1951, Serial No. 230,280

3 Claims. (Cl. 24—160)

This invention relates to fastening devices and particularly to pin type fasteners for holding together fabric articles.

An object of my invention is to provide a fastening device employing pins for piercing the fabric, which device is so constructed as to shield the points of these pins whether the device is in an open or a closed position.

A further object of my invention is to provide a fastener of this character which is biased into a closed position when not in use.

A further object of my invention is to provide a pin fastener having a recess in which the layers of fabric to be fastened are received and arranged prior to being pierced by the pins.

A further object of my invention is to provide a pin fastener in which pins pierce the fabric at substantially right angles to the plane of the fabric.

A further object of my invention is to provide a pin fastener having an extensive base for contact with the fabric or with the body of the wearer for resisting displacement.

In general, my invention is an improvement in safety pins in that its pin points are always shielded and also in that a plurality of pins may be employed in each fastener.

A further object of my invention is to provide a pin fastener which is absolutely safe even when employed immediately adjacent the body of a person and manipulated by hurried or awkward hands.

These and such other objects of my invention as may hereinafter appear will be best understood from a description of the embodiment thereof shown in the accompanying drawings, in which:

Fig. 1 is a side elevation of my pin fastener shown in a closed position;

Fig. 2 is a right end view of the pin fastener shown in Fig. 1;

Fig. 3 is a sectional view of the pin fastener taken on line 3—3 of Fig. 2;

Fig. 4 is a sectional view of the pin fastener taken on line 4—4 of Fig. 3;

Fig. 5 is a sectional view cut on the same plane as Fig. 3 and shows the fastener in an open position; and Fig. 6 is a section view of the pin fastener taken on line 6—6 of Fig. 5.

My pin fastener comprises a U-shaped base member generally indicated at 10, and a lever member generally indicated at 11, which is hinged to the base member at 12, as indicated in Fig. 1. The base member 10 may be formed of sheet metal or it may be cast solid of any suitable material such as a resinous plastic, as indicated.

The space between the substantially parallel legs 15 and 16 of the U-shaped base member forms a recess in which the folds or layers of fabric are received and arranged preparatory to fastening. The lower leg 15 of the base member is wider than the upper leg 16 and is provided with a smooth under surface with beveled edges, as indicated at 17 in Fig. 4. The lower leg 15 also projects beyond the upper leg 16 at the open end of the base member and has a gradually tapered and slightly rounded forward edge, as indicated at 18 and 19 respectively, to provide a smooth leading forward projection which facilitates the entry into the recess of a layer of fabric which may, for example, be lying snugly against the body of a person.

The upper surface 20 of lower leg 15 and the lower surface 21 of upper leg 16 are transversely and longitudinally flat, and the upper surface of leg 16 is rounded, as indicated at 22. The upper leg 16 has a recess 23 which receives the connecting leg 24 of a U-shaped pin structure having pin elements 24a. The leg 16 is also provided with apertures 25 which guide the pin elements and shield their points when the device is in an open position. The upper surface of lower leg 15 is provided with recesses or sockets 26 which receive the points of the pins 24a when the device is closed, as shown in Fig. 3.

The lever 11 is preferably made of sheet metal which is formed to snugly encase the upper rounded portion of upper leg 16 and is pivoted on a pivot 27, which pivot is supported in the base member 10. The pivot 27 may be provided with a head at one end and may be riveted over at its other end as a means of retention. The connecting leg 24 of the U-shaped pin structure is rigidly attached to the under side of lever 11 by any suitable means such as by spot welding, and the pin elements 24a are so shaped and positioned that they will pass through the apertures 25 when lever 11 is swung about its pivot, and so that their extremities or points are received in the sockets 26 when the lever is in a closed position.

The lever 11 is formed downward and slightly inward at its outer end as indicated, thereby to form a resilient lip 28, which snaps over the outer end of the leg 16, and thereby releasably holds the device in a closed position. It will be noted that the end of leg 16 is rounded at 29 to provide a suitable cam surface over which the resilient lip 28 is forced. The pin elements 24a are curved on an arc having pivot 27 as its center. By this arrangement, the pins will pierce the fabric without any tendency to shift the layers of fabric, and will resist displacement, due to the inclination of the pins when the fastener is in a closed position.

A boss 30 is formed at the closed end of base member 10 and is provided with a recess 31, to receive a spring 32, which spring exerts a pressure against the under side of extension 33 of lever 11, thereby normally urging the lever 11 to a closed position when the fastener is not in use. The upper surface 34 of boss 30 is bevelled and forms a stop which is engaged by the under side of extension 33. The movement of lever 11 is thereby limited so that the points of the pins 24a will not be withdrawn from arm 16 and thereby exposed when lever 11 is in an open position.

A plurality of folds or layers of sheet material such as a baby's diaper or a bandage may readily be fastened with my safety pin by first pushing the material between the legs 15 and 16, then with a slight pressure of the thumb on lever 11, the pin elements 24a will pierce the material and the pin points will be received and shielded by the recesses 26 as the resilient lip 28 is snapped over the end of leg 16. Pulling or twisting of the material will not tend to open my safety fastener, as such forces would tend to wedge the material between the slightly inclined pins and the under side of upper leg 16.

From the above description and the drawings, it is apparent that the pin points of my safety fastener are shielded by the lower leg when the fastener is closed, and by the upper leg when the fastener is in an open position. It is understood that my invention is not limited to the specific embodiment shown and described, and various deviations may be made therefrom without departing from the spirit of the invention.

I claim:

1. In a pin fastener, a member having a slot for receiving layers of material to be fastened and including a base and upper and lower legs, apertures extending through one leg, said apertures being longitudinally aligned and connected by a groove in the outer face of said leg, a lever, a pin member fixed to the undersurface of said lever, said pin member being of U-form with its medial body portion arranged for seating in said slot when the pin members extend through said apertures during movement of the lever, said pin members being so positioned as to pass through said apertures and to abut the opposite wall of said slot when said lever is in fastening position, a pivot for said lever extending through said base for pivotally supporting said lever inwardly of one end, a recess in the base of said slotted member, a spring in said recess engaging the adjacent free end of said lever and normally biasing said lever to a fastening position, and stop means on said slotted member for engagement with said lever as it is moved to open position for preventing withdrawal of said pin fully from said apertures.

2. In a pin fastener, a U-shaped member having a base and a pair of substantially parallel legs for receiving therebetween layers of material to be fastened, one of said legs being formed with a pair of spaced transverse apertures, a groove connecting the apertures formed in the outer surface of the apertured leg, a channel shaped lever having its side walls spaced to embrace the side walls of the apertured leg, means pivotally supporting said lever on said base inward of one of its ends, a recess in said base, a spring in said recess engaging the adjacent end of the lever and normally biasing same toward closed position, and a U-shaped pin so fixed within the channel lever that its arms pass through the said apertures during closing movement of the lever and the base of said U-shaped pin is received in said groove when the side walls of the channel embrace the apertured leg.

3. The structure of claim 2 characterized in that the arms of the U-shaped pin are formed on an arc having its center in said lever pivot.

JULIAN E. SAMPSON.

References Cited in the file of this patent

UNITED STATES PATENTS

| Number | Name | Date |
|---|---|---|
| 479,938 | Fredlihp | Aug. 2, 1892 |
| 674,847 | Lundborg | May 21, 1901 |
| 897,976 | Germann | Sept. 8, 1908 |
| 931,023 | Albertoni | Aug. 17, 1909 |
| 1,126,488 | Koski | Jan. 26, 1915 |
| 2,510,250 | Pereira | June 6, 1950 |

FOREIGN PATENTS

| Number | Country | Date |
|---|---|---|
| 764,129 | France | 1934 |